Oct. 15, 1957 R. T. RACE 2,810,071

RADIO RECEIVER

Filed Sept. 11, 1956 3 Sheets-Sheet 1

INVENTOR.
Richard T. Race
BY Mueller & Aichele
Attys.

INVENTOR.
Richard T Race
BY Mueller & Aichele
Attys.

Oct. 15, 1957 R. T. RACE 2,810,071

RADIO RECEIVER

Filed Sept. 11, 1956 3 Sheets-Sheet 3

INVENTOR.
Richard T. Race

BY Mueller & Aichele

Attys.

United States Patent Office 2,810,071

Patented Oct. 15, 1957

2,810,071

RADIO RECEIVER

Richard T. Race, Chicago, Ill., assignor to Motorola, Inc., Chicago, Ill., a corporation of Illinois Application September 11, 1956, Serial No. 609,245

19 Claims. (Cl. 250—20)

The present invention relates to radio receivers of a low voltage type such as are used in automobiles and the like, and more particularly to such a radio receiver of a hybrid type that uses both vacuum tubes and transistors, which may be operated directly by low voltage. This application is a continuation-in-part of my copending application Serial No. 535,948, filed September 22, 1955, for "Radio Receiver."

Automobile radio receivers hitherto have required vibrators and step-up transformers to supply high voltage for energizing the tubes employed therein. With the use of 12-volt (nominal) batteries in automobiles, effort has been directed to providing a receiver operating directly from the voltage from the generator-battery electrical system of the automobile without voltage step up.

It is recognized that an auto radio should provide relatively high volume levels so that it may be heard over noise as the car is driven and that it should have good selectivity and sensitivity to provide usable reception as the receiver may be operated at varying distances from desired stations. Thus a receiver of the superheterodyne type is preferable in order to obtain such sensitivity and selectivity.

A radio receiver adapted for operation directly from the low voltage (e. g. 12 volt D. C.) electrical system of an automobile may conveniently employ vacuum tubes for the high frequency and voltage amplifier stages and a transistor in the power amplifier to drive the loudspeaker. This use of a transistor is desirable since at the present time vacuum tubes are not available which possess a low enough plate impedance to develop sufficient power to drive a loudspeaker efficiently when such a tube is operated at the low D. C. potential encountered in the usual automobile electrical system. Vacuum tubes can however perform voltage amplification functions when operated at a low voltage and fewer of them are needed for the same gain as could be obtained with a given number of presently available transistors.

Although a receiver using only transistors can be operated satisfactorily from 12 volts, in the present state of the art transistors are more expensive than vacuum tubes, and more transistors would be required, and accordingly such a receiver would be quite expensive. Also, transistors have not been found to be well suited for use in certain stages of a receiver because they are sensitive to large changes in temperature and operating voltage which are encountered in an automobile.

In a hybrid receiver wherein both vacuum tubes and transistors are used, it is possible to retain advantages of tube stages and also make use of advantages of transistor stages. However, in such a tube-transistor radio, the relatively high plate impedance of the vacuum tube in the preceding stage is generally a mismatch for the low input impedance of the transistor in a power amplifier. To obtain the advantages of operation directly from the automobile voltage a circuit in which tubes and transistors are effectively used in combination is required.

It is, accordingly, an object of the invention to provide a radio receiver operated directly from the battery voltage of the electrical system of an automobile.

Another object of the invention is to provide an automobile radio receiver of the superheterodyne type which does not require a voltage step-up device to provide operating potentials from the battery voltage.

Another object of the invention is to provide an improved tube-transistor hybrid radio receiver that is especially adapted for operation directly from the relatively low-voltage electrical system of an automobile without the need for voltage step-up arrangements of any type.

It is a further object of this invention to provide a radio receiver of the type described above which incorporates vacuum tube stages and a transistor power amplifier coupled together in an improved and inexpensive manner, and in which the mismatch problems between the vacuum tube and transistor stages are successfully solved without the need for expensive coupling network.

A feature of the invention is the provision of a radio receiver including vacuum tubes for amplifying and converting the received signals, and a power transistor as the audio output stage to drive a speaker.

Another feature of the invention is the provision of an automobile radio receiver energized directly by the low voltage electrical system of an automobile and including at least one voltage amplifier stage including a vacuum tube supplied with power directly from the electrical system and a power amplifier stage including a transistor driven by the voltage amplifier stage for operating a loudspeaker of the radio.

A further feature of the invention is the provision of a superheterodyne automobile radio having no power voltage step-up means but which is operable directly by the variable low voltage of the battery-generator power supply of the automobile and which utilizes vacuum tubes in the voltage amplification and converter stages thereof so that variations in the supply voltage and temperature do not unduly affect the characteristics thereof, and having a low impedance transistor power amplifier output stage for current amplification of the audio signal.

Still another feature of the invention is the provision of a hybrid receiver including a plurality of amplifier stages, a converter stage, an audio driver stage and a transistor power output stage all energized directly from a 12-volt automobile battery, and with the audio driver stage being connected in a space charge circuit and driving the transistor output stage.

A further feature of the invention is the provision in a hybrid tube-transistor radio receiver of a transistor power amplifier that is directly coupled and impedance matched to a preceding vacuum tube amplifier without the requirement for a matching transformer or similar extraneous equipment. The direct coupling may be made so that the energizing potential for the tube is supplied through the transistor and the transistor itself provides the load for the tube.

Another feature of the invention is the provision in such a radio of a transistor power amplifier in which the vacuum tube of the preceding amplifier is directly coupled to the transistor as noted above, and which tube functions to provide bias and automatic current stabilization for the transistor especially when the operating power is initially applied to the transistor so as to protect the transistor and prolong its life.

Yet another feature of the invention is the provision of an improved tube-transistor hybrid radio receiver of a direct connection between the first control grid of the tubes in several of the receiver stages to the low voltage D. C. source so as to draw electrons from the cathodes and prevent a space charge, thus enabling the anodes of the vacuum tubes to be operated efficiently at a relatively low exciting D. C. voltage.

Further objects, features, and the attending advantages of the invention will be apparent upon consideration of the following description when taken in conjunction with the accompanying drawings in which:

Fig. 1 is a circuit diagram of a radio receiver incorporating a transistorized power amplifier stage in accordance with one embodiment of the invention;

Figs. 2*a* and 2*b* show a modification of the transistorized power amplifier;

Fig. 3 is another modification of the power amplifier;

Figs. 4*a*, 4*b* and 5 are further modifications of the power amplifier;

The invention provides a hybrid radio receiver in which vacuum tubes are employed in the voltage amplification stages, including a radio frequency amplifier stage, a converter or oscillator-mixer stage, an intermediate frequency amplifier stage, and at least one audio driver stage, all of which are supplied with direct current from the battery voltage of an automobile without step-up of such voltage. The audio driver stage feeds an audio power output stage including one or more power transistors. The power transistor also operates directly from the battery voltage of the automobile without voltage step up. One or more of the vacuum tube amplifier and driver stages may be of the space charge type with a space charge grid positioned between the cathode and signal grid thereof to provide a greatly enhanced voltage gain for this tube when operating on low plate voltage.

The invention further provides a radio receiver in which a vacuum tube having a relatively low plate resistance is directly connected to the base electrode of a transistor power amplifier. The anode exciting potential for the tube is provided, in one embodiment, by the base electrode of the transistor where it appears by virtue of the application of an exciting D. C. potential across the collector and emitter electrodes of the transistor. A cathode bias resistor connecting the cathode of the tube to ground also provides bias and current stabilization for the transistor. With the described circuit, any change in the plate resistance of the vacuum tube as the tube is driven by a received signal alters the current through the base of the transistor to provide an input signal for the transistor.

Figures 1, 8, 9:
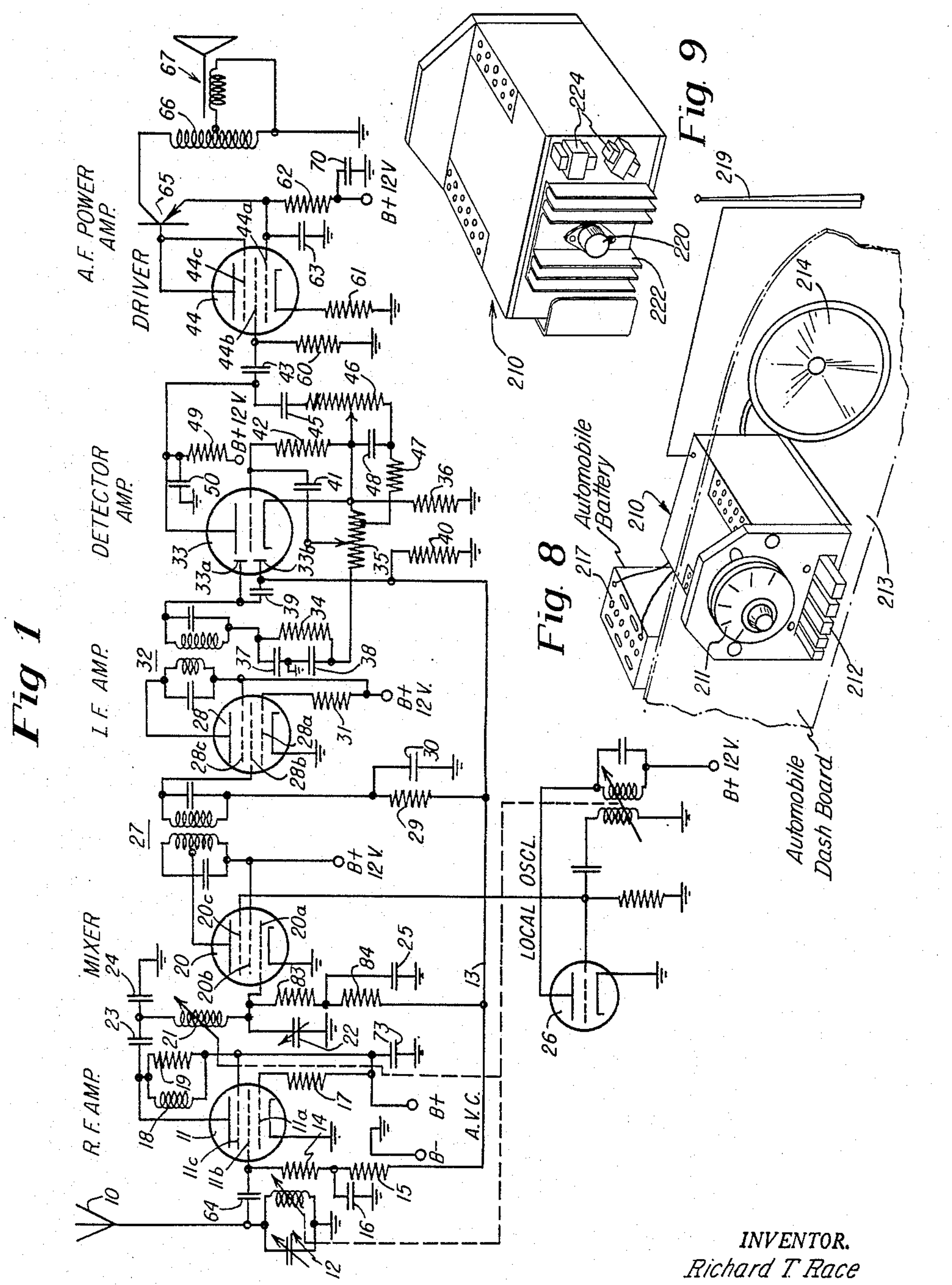
Fig. 8 is a perspective view showing a receiver in accordance with the invention in an automobile.
Fig. 9 is a rear view of the receiver of Fig. 8.

The receiver of Fig. 1 includes an antenna 10 which is connected to the second control grid **11*b* of a vacuum tube 11 connected as a radio frequency amplifier. This control grid is connected to one side of a parallel tuned tuning circuit 12, and the other side of this circuit is connected to a point of reference potential such as the chassis of the receiver or ground. The second control grid 11*b* is also connected to the automatic volume control (AVC) lead 13 through a pair of series resistors 14 and 15 whose common junction is established at ground potential for alternating currents by a capacitor 16. The first control grid 11*a* of device 11, that is the control grid between the second control grid 11*b* and the cathode, is connected through a resistor 17 to the positive terminal of a unidirectional (D. C.) potential source. This may be the nominal 12 volt battery of a present-day automobile which voltage may vary from about 11 volts to 15 volts under various conditions of operation. The negative terminal of this source is connected to the point of reference potential, or ground, and the source is by-passed for alternating currents to the point of reference potential by a capaictor 73. The cathode of device 11 is connected to ground. The screen electrode 11*c* is connected directly to the D. C. source, and the anode is connected to that source through a self resonant inductance coil 18 shunted by a resistor 19** forming an I. F. trap.

The anode of tube 11 is coupled through a coupling network to the control grid **20*a* of a vacuum tube 20 in the mixer stage of the receiver. The coupling network includes an inductance coil 21 and capacitors 22 and 24 connected as a pi network. Capacitors 23 and 24 are series-connected between the anode of device 11 and the point of reference potential or ground, and the inductance coil 21 is connected from the junction of these capacitors to the control electrode 20*a* of tube 20. The capacitor 22 is connected between the control electrode 20*a* and ground, the control electrode is connected to the AVC lead 13 through a resistor 83 and a resistor 84, the junction of these resistors being established at ground potential for alternating currents by a capacitor 25**.

A local oscillator including a vacuum tube 26 connected in known manner is connected to the control grid **20*c* of tube 20. The screen grid 20*b* is directly connected to the D. C. voltage source, and the anode is connected to the primary circuit of a usual double-tuned coupling system 27. One side of the tuned secondary circuit of coupling system 27 is connected to the second control grid 28*b* of a vacuum tube 28 which is connected as the intermediate frequency amplifier of the receiver. The other side of the tuned secondary circuit is connected to the AVC lead 13 through a resistor 29 which is by-passed to ground by a capacitor 30. The cathode of device 28 is connected to ground. The first control grid 28*a*, that is, the control grid between the second control grid 28*b* and the cathode is connected through a resistor 31 to the D. C. source. The screen grid 28*c* of device 28 is directly connected to the D. C. source, and the anode of this device is connected to that source through the primary circuit of a usual double-tuned coupling system 32. The tuned secondary of coupling system 32 has one side connected to the plate 33*a* of the second detector diode which is incorporated in the envelope of vacuum tube 33. The other side of the tuned secondary circuit of coupling system 32 is connected to the cathode of device 33 for direct current through a resistor 34 and a volume control resistor 35, the cathode being connected to ground through a resistor 36. Resistor 34 is shunted by a pair of series by-passing capacitors 37 and 38** whose common junction is connected to ground.

Vacuum tube 33 includes a second diode whose anode **33*b* is coupled to the anode 33*a* through a capacitor 39, and the anode 33*b* is connected to ground through a resistor 40 across which the AVC voltage is developed and applied to lead 13**.

The movable tap on volume control resistor 35 is coupled through a capacitor 41 to the control grid of a triode section included in device 33. The control grid is connected to the cathode through a grid leak resistor 42 and the anode of this section is coupled through a capacitor 43 to the second control grid **44*b* of a driver discharge device 44. The anode of the triode section of tube 33 is also coupled through a capacitor 45 and resistors 46 and 47 to a point on volume control resistor 35. The junction of resistors 46 and 47 is coupled through a capacitor 48 to the cathode of tube 33, and resistor 46 has a variable tap connected to the cathode for tone control purposes. The anode of the triode section of tube 33 is connected to the D. C. source through a load resistor 49 which is by-passed by a capacitor 50** for the intermediate frequency.

The operation of the circuit thus far described, briefly, is as follows. Tuned circuit 12 may be tuned to a signal intercepted by antenna 10, and such a signal is impressed on the second control grid **11*b* of radio frequency amplifier 11. A D. C. voltage is impressed on the first control grid 11*a* of the amplifier to draw the electrons from the cathode. This reduces the space charge effect which enables the tube to operate at low D. C. anode voltages. This permits the anode of the tube to be connected directly to the low voltage source without the need for voltage step-up devices and enables the tube to operate efficiently with such low anode voltage. The amplified R. F. signal is supplied to mixer tube 20 wherein it is heterodyned with the local oscillation from the oscillator device 26 to provide an intermediate frequency signal at the selected intermediate frequency of the receiver. This intermediate frequency signal is selected by coupling system 27 and impressed on the intermediate frequency amplifier tube 28. This tube also has its first grid 28a connected to the D. C. source to reduce the space charge effect and enable the amplifier to be operated efficiently on the low voltage electrical system of an automobile. The amplified intermediate frequency signal from amplifier 28 is supplied through coupling system 32 to the second detector to develop a detected audio signal across resistors 34, 35, and 36. The variable tap on resistor 35 supplies this signal with controllable amplitude to the control grid of the triode section of tube 33. This section functions as an audio amplifier and supplies the amplified audio signal to the control grid 44b of driver tube 44**.

Resistor 49 connected to the anode of triode section of tube 33 serves as a load impedance for the audio amplifier. A resistor 60 between the second grid 44b of device 44 and ground provides the grid leak for device 44, and resistor 61 connected between the cathode of the tube or device 44 and ground provides a self-biasing potential for the tube. The first grid 44a of device 44, that is, the grid between the cathode and the second grid 44b, is connected to the positive D. C. potential source through a resistor 62. The source and resistor 62 are shunted by a capacitor 63 in order to provide a non-varying direct current potential at the grid 44a. The screen grid 44c of device 44 between the second grid 44b and the anode, is directly connected to the anode. The interchange of the first and second control grids of device 44 is for the purpose previously referred to herein to provide more efficient operation of this device at a relatively low anode potential.

The anode of device 44 is directly connected to the base electrode of a p-n-p power transistor 65. The emitter electrode of the transistor is connected to the positive potential source, by-passed to ground for signals by capacitor 70, through the resistor 62, and the collector electrode is connected to the point of reference potential or ground through the primary of an output auto-transformer 66. The loudspeaker 67 has its voice coil connected across the secondary portion of the output transformer 66, so that the transformer provides an impedance match between the output impedance of the transistor 65 and the voice coil.

Accordingly, it may be seen that the emitter of transistor 65 essentially is at alternating current (A. C.) ground by virtue of capacitor 63; and that the collector is substantially at direct current (D. C.) ground due to the low D. C. impedance of transformer 66. Therefore, the potential source is essentially connected across the collector and emitter electrodes. Thus, a D. C. potential of approximately 12 volts appears at the base electrode of transistor 65, and this potential serves as an operating or exciting potential for the anode of driver tube 44.

As the signal from amplifier 33 is applied to the control grid 44b of device 44, the plate resistance of the device will vary in accordance with this signal. This variation in the plate resistance is reflected as a variation of current flow in the collector-emitter circuit of the transistor to drive the loudspeaker 67 through the output transformer 66.

The circuit of tube 44 and power transistor 65 also provides a means for biasing the base electrode of the transistor for class A operation, and for providing automatic D. C. stabilization to the transistor so as to limit the collector current during the warm-up interval of the transistor. After the transistor is first energized, the collector-emitter resistance varies due to temperature changes with resulting variation in collector current which also tends to vary the current through the base electrode. However, variation in base current produces a varying voltage across the tube 44 and its cathode resistor 61, and this voltage provides automatic D. C. stabilization of the transistor by changing the bias voltage on the base electrode in a direction to oppose such current variation. Furthermore, it may be seen that due to the voltage drop across the tube 44 and resistor 61, the base electrode of the transistor will be somewhat positive with respect to the collector electrode to provide necessary bias for proper operation of the transistor.

Resistor 62 has a relatively low value of the order of 1 ohm, and it further improves the D. C. stabilization of the transistor due to the fact that when the emitter current increases due to temperature changes in the transistor, the resulting voltage drop across this resistor causes the control grid 44a of tube 44 to reduce the space current in the tube, with a corresponding reduction in the base current in transistor 65.

In a constructed embodiment of the receiver of Fig. 1, the following constants were used, and these are listed herein merely by way of example and are not intended to limit the invention:

| | |
|---|---|
| B+ | 12 volts D. C. |
| Resistor **14** | 100 kiloohms. |
| Resistor **15** | 1.5 megohms. |
| Capacitor **16** | .02 mfd. |
| Tube **11** | DT511. |
| Resistor **17** | 470 ohms. |
| Resistor **83** | 470 kiloohms. |
| Resistor **84** | 1.5 megohms. |
| Capacitor **25** | .01 mfd. |
| Tube **20** | 12BD6. |
| Capacitor **64** | 1000 mmfd. |
| Tube **26** | 6C4. |
| Resistor **29** | 1.5 megohms. |
| Capacitor **30** | .01 mfd. |
| Resistor **31** | 470 ohms. |
| Resistor **34** | 47 kiloohms. |
| Tube **28** | DT511. |
| Tube **33** | 12BF6. |
| Resistor **35** | 1.0 megohm. |
| Resistor **42** | 10 megohms. |
| Capacitor **41** | .003 mmfd. |
| Resistor **36** | 56 ohms. |
| Resistor **40** | 9.4 megohms. |
| Capacitor **39** | 27 mmfds. |
| Capacitor **45** | .01 mfd. |
| Resistor **46** | 4.0 megohms. |
| Resistor **47** | 100 kiloohms. |
| Capacitor **48** | .005 mfd. |
| Resistor **49** | 470 kiloohms. |
| Capacitor **50** | 220 mmfds. |
| Capacitor **43** | .1 mfd. |
| Tube **44** | DT511. |
| Resistor **60** | 2.7 megohms. |
| Resistor **61** | 30 ohms. |
| Resistor **62** | 1 ohm. |
| Capacitor **63** | 1000 mmfds. |
| Transistor **65** | p-n-p fused-junction power transistor Motorola 2NJ4. |

Figures 2A, 2B, 3, 4A, 4B:
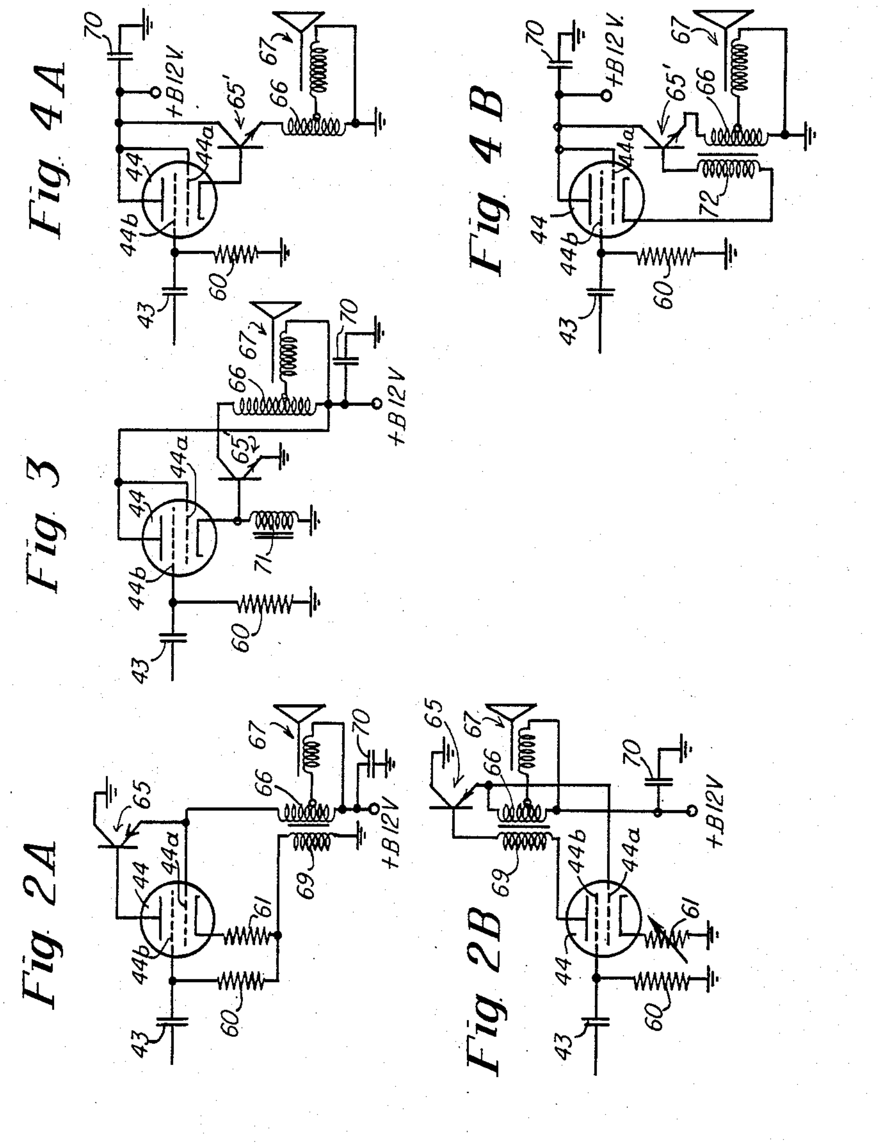

In the modification of Fig. 2*a*, the transistor 65 is connected as a grounded collector amplifier, and in this figure components corresponding to those of Fig. 1 have been given the same reference numerals. In the embodiment of Fig. 2*a*, the collector is directly connected to ground, and the emitter is connected through the output transformer 66 to the D. C. source. The resistor 60 and cathode resistor 61, instead of being directly connected to ground are connected thereto through an additional winding 69 on the transformer 66.

In the usual grounded collector circuit the drive current is applied between the base and ground and the output load in the emitter circuit is essentially in series with the drive current. Dynamically, the drive current is in phase with the emitter current, but there is a 180° phase reversal in the output transformer 66, which sets up a current that tends to create degenerative effects and cancel out the drive current, essentially giving the gain of a common collector configuration. It is evident that to overcome this degeneration, the drive current for the transistor must be applied between the base and the emitter side of the load inductance, but this cannot be done directly if tube 44 is to retain its previously described control and drive on the transistor. The same effect is achieved by adding the winding 69 to the output transformer and connecting it between the cathode resistor 61 and ground. The cathode of tube 44 now swings in phase with the phase reversed signal in transformer 66 just as if it were connected to the emitter so as to reduce degeneration and the amount of drive required by the transistor, thereby giving the gain of a common emitter circuit. Tube 44 retains its original function of driving the transistor by variation in its plate resistance, and of providing proper bias to the transistor and temperature variation compensation.

Fig. 2*b* is essentially similar to Fig. 2*a* with the exception that the additional winding 69 of transformer 66 is interposed in the anode circuit rather than the cathode circuit of tube 44. The operation of this circuit is essentially the same as that of Fig. 2*a*, with the voltage appearing across winding 69 overcoming the degeneration in the circuit.

The circuits of Figs. 2*a* and 2*b*, like the circuit of Fig. 1, use a p-n-p power transistor. The modification of Fig. 3 is intended to adapt the circuit for an n-p-n power transistor designated 65'. Transistor 65' is connected as a grounded emitter, and the base electrode is driven by the cathode of device 44 which is connected to ground through a choke coil 71 rather than resistor 61 of the previous embodiment. The emitter electrode of transistor 65' is connected directly to ground and the collector is connected to the anode of tube 44 and to the D. C. source through the output transformer 66. As before, the output transformer is connected to the loudspeaker 67.

The circuit of Fig. 3 operates essentially in the same manner as that of Fig. 1 except that the cathode drive is used to provide the proper relative polarities of the transistor bias potentials. The signal developed across choke coil 71 drives the transistor, and the use of a choke provides a low resistance for biasing the transistor without substantially absorbing the drive signal. This enables the tube to develop more driving power by virtue of the higher plate current. The positive terminal of the D. C. source is connected through output transformer 66 to provide a positive exciting potential to the collector, and this terminal is directly connected to the anode of tube 44. The first grid 44a is connected to the anode to reduce the space charge effect for the previously described reasons.

The base is negative with respect to the collector since the cathode voltage to which it is connected is less than the plate and collector voltage. Also, the emitter is slightly negative with respect to the base because of the small positive voltage across choke 71.

The circuits of Fisg. 4*a* and 4*b* use the n-p-n transistor connected as in a grounded collector circuit (for alternating currents). As in the case of the circuit of Fig. 3, a cathode drive is used to the base electrode to provide the correct polarities for the transistor bias potentials. The emitter is connected to ground through the output transformer 66. The collector is directly connected to the positive terminal of the D. C. source, as is the anode and first grid 44a of device 44.

The cathode is directly connected to the base in Fig. 4*a*. As in the previous embodiments, any variation in the space current of the tube due to the signal on grid 44b, produces a corresponding variation in the transistor so that a power amplified signal is supplied to speaker 67.

As in the case of the embodiment of Fig. 2*a*, the signal appearing across output transformer 66 in Fig. 4*a* produces degeneration in the cathode circuit of the system, and this can be compensated by the additional winding 72 (of Fig. 4*b*) which is inductively coupled to the transformer 66 and interposed between the cathode and the base electrode.

Figures 5, 6, 7:
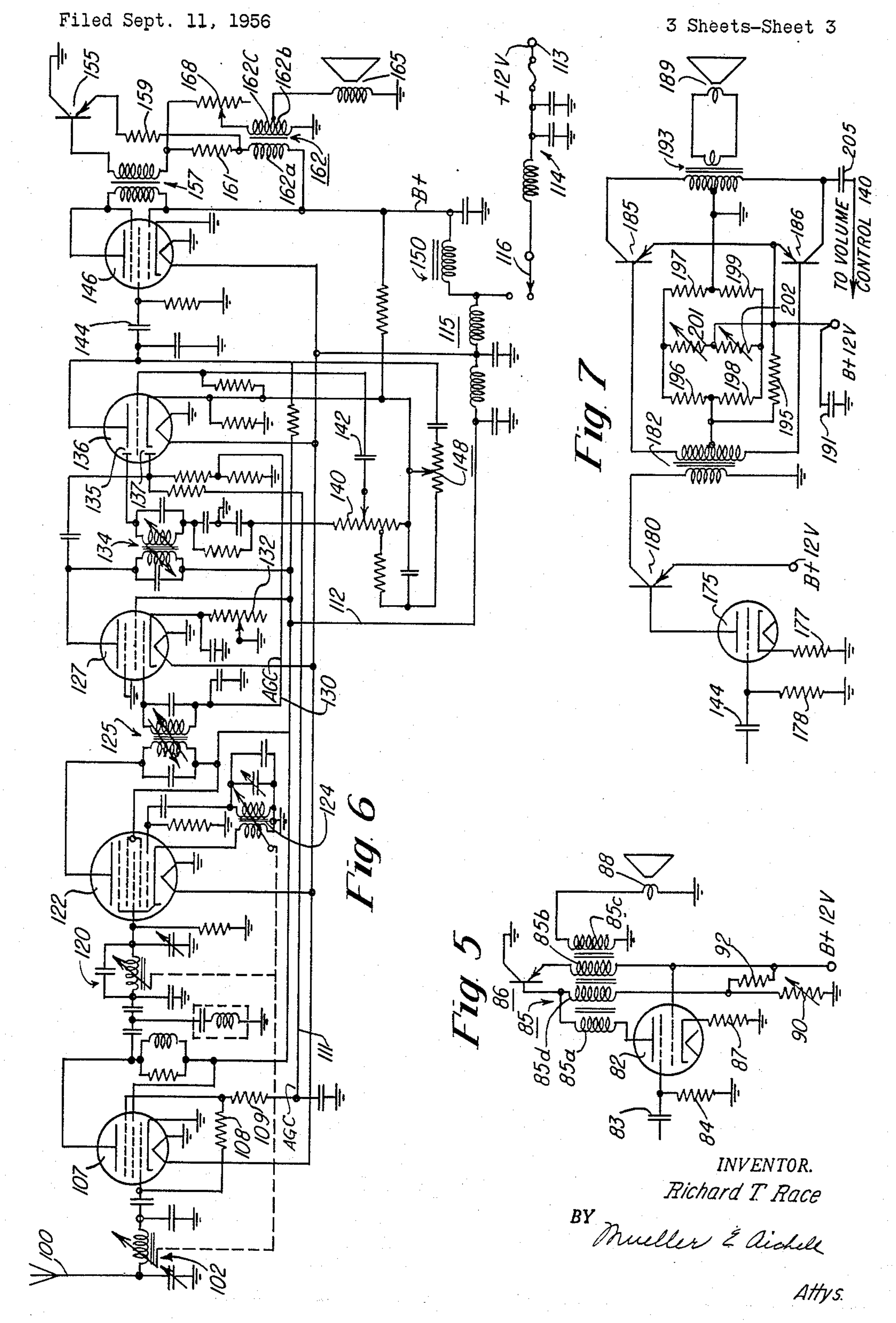
Fig. 6 is a diagram of a radio circuit forming still another embodiment of the invention.
Fig. 7 shows still another embodiment of the power amplifier of the invention.

In Fig. 5 there is shown a further modification of the invention including an audio driver tube 82 and a power output transistor 86 which drives a loudspeaker 88. The preceding stages of the receiver may be similar to those shown in Fig. 1. Audio signals are applied through coupling capacitor 83 to the second grid of tube 82, a D. C. path to ground for which is provided by resistor 84. The first grid of tube 82 is coupled to the 12 volt B-plus source providing a space charge circuit which has been described previously. The cathode of tube 82 is grounded through a bias resistor 87 and the anode thereof is directly coupled through winding **85*a* of transformer 85 to the base electrode of transistor 86. Winding 85*b* of this transformer is connected between B-plus and the emitter electrode of transistor 86 and this winding is inductively coupled to an output winding 85*c* which drives speaker 88. The collector electrode of transistor 86 is connected to ground and a bias potential for the base is applied through transformer winding 85*d*. This bias is developed across a voltage divider including variable resistor 90 and resistor 92 connected between ground and B-plus. The junction of resistors 90, 92 is connected through winding 85*d* to the base of transistor 86**.

In this circuit stabilization is provided which is essentially independent of the driver tube 82. Winding **85*a* performs the function of winding 69** of the circuit shown in Fig. 2*b*, namely that of dynamically injecting the drive signal between the base and the emitter of the transistor for common emitter operation and reduction of degeneration. Winding **85*b* is, of course, the output or load winding which drives the speaker through winding 85*c*. Winding 85*a* is constructed so that the output signal is effectively cancelled in the input circuit, and winding 85*d* is constructed so that the base is essentially isolated from the biasing and stabilization network (resistors 90, 92). It is also possible to utilize a separate audio frequency choke in place of winding 85*d*** in order to isolate the base from its biasing network at signal frequencies.

In the circuit of Fig. 5, which has a separate biasing network for the base of transistor 86, it is possible to obtain improved collector current stability at temperatures in excess of 60° C. Furthermore, the system provides improved operation at high signal levels. In a direct coupled system of this type where the anode of tube 82 directly drives the transistor 86 and the transistor provides the load for this tube, there is a tendency for the drive signal to increase the bias on the driver tube and alter the bias on the transistor thus shifting its operating point since the transistor is directly connected to the tube. However, with a separate biasing system provided as shown, operation at higher signal levels may be obtained without impairment of circuit operation as outlined above.

The circuit of an automobile radio receiver which is another embodiment of the invention is shown in Fig. 6. An antenna 100 is connected to a tuned circuit 102 which selects the received signals. Radio frequency signals are fed from the circuit 102 to a radio frequency amplifier stage including tube 107. The control grid of this tube is connected to the suppressor grid by resistor 108, and an automatic gain control voltage is applied through lead 111 to both these grids through resistor 109. Nominal 12 volt B-plus potential is applied from line 112 to the screen grid and to the plate from terminal 113, which may be the positive battery terminal of an automobile, through filter networks 114 and 115, and switch 116.

The output of the radio frequency amplifier is coupled through tuned circuit 120 to the signal grid of tube 122 in the converter stage. The converter stage develops local oscillations and heterodynes the radio frequency signals therewith to form an intermediate frequency signal. The oscillator portion of the converter is tuned by circuit 124. The tuned circuits 102, 120, and 124 may be ganged together in a known manner. Signals at intermediate frequency are then derived from the anode of tube 122 and applied through tuned transformer 125 to the control grid of intermediate frequency amplifier tube 127. An automatic gain control potential may be applied to the tube 127 through lead 130 and an adjustment for the sensitivity of this amplifier stage is provided by a variable resistor 132 in the cathode circuit of tube 127.

The output of the amplifier tube 127 is applied through tuned transformer 134 to a diode 135 of tube 136. It is to be noted that the screen grid of tube 127 is connected directly to line 112 as is the screen grid of tube 107, and this provides maximum voltage gain in the stages including these tubes. The circuit connected to transformer 134 and diode 135 is constructed to demodulate the signal and develops signals of audio frequency across the volume control 140.

A portion of the intermediate frequency signal is also applied to a further diode 137 in tube 136 which rectifies this signal to provide automatic gain control potentials applied through leads 111 and 130 to control the gain of tubes 107 and 127 respectively. As previously stated, the volume control potential on lead 111 is applied to both the control grid and the suppressor grid of tube 107. As shown in Fig. 6, the lead 103 is connected to the diode 137 through a voltage divider so that only a portion of the volume control potential produced by diode 137 is applied to the intermediate frequency amplifier tube 127.

A variable arm of volume control 140 is connected through capacitor 142 to the control grid of tube 136 so that audio signals may be amplified in this tube. The output of tube 136 is coupled through capacitor 144 to the control grid of audio driver tube 146. A tone control network 148 is connected between volume control 140 and the output of tube 136 and operates in a manner understood in the art.

The audio signals are applied to the second grid of audio driver tube 146 and the first grid of this tube is connected through a filter choke 150 to the junction of switch 116 and filter network 115. The first grid is therefor energized by the B-plus potential to provide a space charge circuit for driving power transistor 155. A circuit of this type is able to supply a higher drive power and has a lower output impedance to provide a better impedance match for transistor 155. The output is derived from tube 146 and coupled by way of transformer 157 to the base of transistor 155.

The collector of the transistor is grounded and the emitter thereof is connected to transformer 157 through stabilization resistor 159 and biasing resistor 161. The B-plus energizing potential is applied to the emitter of transistor 155 from the filter choke 150 through the primary **162*a* of output transformer 162 and resistor 159. The winding 162*b* of transformer 162 has one side grounded and the other side coupled to loudspeaker 165. A winding 162*c* is connected to winding 162*b* and variable resistor 168, which is connected to the base of transistor 155 through the secondary winding of transformer 157**.

The output load for the power amplifier stage including transistor 155 is formed by winding **162*a* which couples the signal through winding 162*b* to the speaker 165. A biasing network for the base of transistor 155 is formed by windings 162*b* and 162*c*, resistor 168, resistor 161, and winding 162*a*** which are series coupled between ground and *b*-plus. The potential existing at the junction of resistors 161 and 168 is applied to the base of transistor 155 and the inductive relation between windings **162*a* and 162*b*, 162*c* provide points of equal signal voltage across the resistors 161 and 168** so that the signals are not shunted to ground through the biasing network.

The tubes 107, 122, 127, 136, and 146 are illustrated as being of the indirectly heated type, with the heaters connected through the filters 114 and 115 and switch 116 to the terminal 113 which forms the voltage source for the receiver. The heaters of the various tubes are connected in parallel to the voltage source. Directly heated tubes may, of course, be used with the filaments thereof connected in parallel to the low voltage source. Accordingly, all of the potentials required for operation of the receiver are derived directly from the battery generator voltage source of the vehicle in which the receiver is installed. The operating voltages are no greater than the source voltage, which may be slightly less than the battery voltage because of the filters required. This makes for minimum energy consumption by the receiver and eliminates the relatively expensive and troublesome vibrator type power supply normally used.

The circuit of Fig. 7 shows a further form of the audio amplifier system which may be used in the described receivers. In this embodiment, audio signals are applied through coupling capacitor 144 (Fig. 6) to the control grid of triode tube 175. The cathode of this tube is biased by resistor 177 connected between cathode and ground, and a D. C. return for the control grid is provided by resistor 178. The anode of tube 175 is directly connected to the base of transistor 180 for direct drive thereof. The emitter of transistor 180 is connected to the B-plus potential source (12 volts) and the collector of this transistor is connected through the load impedance provided by the primary winding of transformer 182 to ground. Accordingly, as described in connection with the circuits of Fig. 1, the transistor is directly driven by the preceding vacuum tube and the energizing potential as well as the load for the tube are furnished by the transistor.

The secondary winding of transformer 182 is connected across the bases of transistors 185 and 186 which are connected in a push-pull circuit for driving loudspeaker 189. The emitters of these transistors are connected together and to the B-plus potential source which is established at ground for signals by capacitor 191. The collectors of the transistors are connected across the primary winding of output transformer 193, the secondary of which is connected to speaker 189. The center tap of the primary winding of transformer 193 is grounded. A biasing network for the bases of transistor 185, 186 is provided by a network connected between ground and B-plus, which network is connected to the bases of these transistors through the center tap of the secondary winding of transformer 182. The network includes resistor 195 connected from B-plus to the center tap of the secondary winding, a first pair of resistors 196, 197 connected in series from the center tap to ground, and a second pair of resistors 198 and 199 also connected from the center tap to ground. A pair of thermisters 201 and 202 are series connected between the junctions of resistors 196, 197, and resistors 198, 199. The junction of the thermisters is coupled to B-plus.

The resistor network providing bias for the bases of transistors 185, 186 may thus be temperature compensated to provide improved operation over the wide temperature conditions in which an automobile radio receiver may be required to operate. It is contemplated that the thermistors 201 and 202 provide a decreasing resistance with an increase in temperature in order to decrease the bias current on transistors 185 and 186 and prevent damage thereto as the conduction tends to rise in the transistors with an increase in the temperatures thereof. In order to reduce distortion in the amplifier circuit, it is also possible to connect the emitter of transistor 186 through capacitor 205 to a tap point on the volume control 140 (Fig. 6) thus providing a certain amount of negative feedback in the system to improve the audio response in a manner understood in the art. The feedback path may also extend from the secondary of one of the output transformers 193, 162, 85, 66, etc., to the volume control 140 or 35 (Fig. 1).

Fig. 8 shows receiver 210, constructed in accordance with the circuits described in the foregoing and mounted in an automobile. The receiver includes a dial 211 which indicates the frequency to which the receiver is tuned and pushbuttons 212 for selecting desired stations by means of a system (not shown) known in the art. The receiver 210 is shown supported by a dashboard 213 with a suitable loudspeaker 214 also mounted therewith. Power is supplied to the receiver by means of a connection to the standard auto battery 217 and radio frequency energy is applied to the receiver from antenna 219.

Fig. 9 is a rear view of the receiver 210 and shows a transistor 220 which is included in the audio power amplifier stage of the receiver to drive speaker 214. Transistor 220 is supported on a heat radiator 222 which includes radiating fins to conduct heat away from the transistor and maintain it at a suitable operating temperature. It may be noted that several of the circuits previously described include a grounded collector circuit in the final audio amplifier stage and this circuit lends itself to efficient heat dissipation since the collector electrode of the transistor may be connected directly to the outer housing or shell thereof which is in direct heat and electrical contact with the heat radiator 222. Also shown in this view are a pair of filter chokes 224 which are used to filter the current used to operate the receiver directly from the automobile battery generator electrical system. These chokes may be incorporated into the previously described filter networks 114 and 115 (Fig. 6).

The invention accordingly provides a simple and effective superheterodyne type radio receiver which utilizes both vacuum tubes and a power transistor amplifier.

This improved radio receiver is suitable for operation directly from the electrical system of an automobile furnishing a voltage of the order of 12 volts. It is thus possible to do away with the usual vibrator type power supply together with its power transformer, rectifier, and other associated components. This reduces the cost as well as the size and weight of the radio receiver and provides a receiver requiring a minimum of servicing. It may also be appreciated that battery drain is reduced over conventional receivers of the prior art which utilized inefficient power converting apparatus and additional tubes in the audio stages requiring filament current. Furthermore, power supply hum and noise may be greatly reduced in the receiver of the invention since no vibrator is used.

The described receiver is of the superheterodyne type to maintain desirable selectivity and sensitivity for highly satisfactory reception of signals when the receiver is either near or far from the stations to be received. It may be noted that each of the stages of the receiver may be energized directly from the auto battery-generator voltage which thus provides the anode potential, the grid potentials, the filament or heater potentials, and any necessary biasing potentials for the vacuum tube stages of the receiver. This same battery-generator voltage does, of course, also supply the energizing and biasing potentials for the transistor audio amplifier stage or stages. Therefore, by using a combination of vacuum tubes and transistors in a radio receiver it is possible to efficiently obtain voltage amplification of signals as well as current amplification thereof to obtain both sensitivity and power for driving a loudspeaker.

The improved receiver may be so constructed that the transistor power amplifier is coupled to the preceding tube stage without the need for coupling transformers and complicated coupling networks, so that the cost and physical size of the system are further reduced. Furthermore, the vacuum tube and its associated biasing means provide an efficient D. C. stabilization network for the transistor when the system is initially energized, thus electrically protecting the transistor and prolonging its life.

I claim:

1. A radio receiver of the superheterodyne type to be used in a vehicle and energized from a battery of the vehicle which provides a direct current potential having a nominal value of 12 volts, such receiver including in combination, means providing voltage amplification of received radio frequency signals and including a first vacuum tube, means providing frequency conversion of received radio frequency signals to intermediate frequency signals and including a second vacuum tube, means providing voltage amplification of the intermediate frequency signals and including a third vacuum tube, means demodulating the intermediate frequency signals to provide audio frequency signals, means deriving a control voltage representing the average value of the amplified intermediate frequency signals, said last named means including portions applying said control voltage to said first and third vacuum tubes for controlling the gain thereof, means providing amplification of the audio signals including a fourth vacuum tube and at least one power transistor device providing the audio output signals, a loudspeaker coupled to said power transistor device for reproducing the audio output signals, means whereby said fourth vacuum tube and said power transistor device produce audio frequency current sufficient to drive said loudspeaker to produce sound at a level which can be conveniently heard in the vehicle, and means providing operating potential for the receiver circuit from the battery including filter means and direct current circuit means connected to each of said vacuum tubes and to said power transistor device, said potential providing means deriving a single direct current voltage from the battery and applying only this single voltage to all of the circuits of the entire receiver so that all of such circuits are energized by a voltage no greater than that of the battery.

2. In a radio receiver of the superheterodyne type to be used in a vehicle and energized from a battery of the vehicle which provides a direct current potential having a nominal value of 12 bolts, and which receiver has radio frequency amplifier means with a first vacuum tube, converter means with a second vacuum tube, intermediate frequency amplifier means with a third vacuum tube, detector means, automatic volume control means with portions applying a control voltage to the radio frequency amplifier means and the intermediate frequency amplifier means, and a loudspeaker, the combination in the radio receiver including, audio amplifier means for amplifying the audio signals including a fourth vacuum tube and at least one power transistor device, said amplifier means including means coupled to said fourth vacuum tube and to said power transistor device and connecting the same in cascade between the detector and the loudspeaker and providing audio frequency current to the loudspeaker sufficient to produce sound at a level which can be conveniently heard in the vehicle, and energy applying means for connection to the vehicle battery including filter means and direct current circuit means connected to each of said vacuum tubes and said power transistor device, said energy applying means deriving a single direct current voltage from the battery and applying only such voltage to all the circuits of the entire receiver, so that all the circuits of the receiver are energized by a single voltage no greater than that of the battery, said energy applying means providing current to said receiver circuits without the use of vibrator-voltage-changing-apparatus and requiring less energy from the vehicle electrical system than energy applying means including such vibrator-voltage-changing-apparatus.

3. In a radio receiver to be used in a vehicle and energized from a battery of the vehicle which provides a direct current potential having a nominal value of 12 volts, and which receiver has a radio frequency amplifier circuit portion, a converter circuit portion, an intermediate frequency amplifier circuit portion, a detector and audio amplifier circuit portion, and a loudspeaker, with the circuit portions being connected together to form a superheterodyne circuit, and each of the circuit portions including a vacuum tube, the combination in the radio receiver including, transistor audio output means including at least one power transistor device for amplifying the audio signals, said transistor audio output means applying signals to the loudspeaker, said transistor audio output means being connected to the audio amplifier circuit portion and cooperating therewith to provide audio frequency current sufficient to drive the loudspeaker to produce sound at a level which can be conveniently heard in the vehicle, circuit means for connection to the battery including portions connected to each of the vacuum tubes and to said power transistor device and applying thereto only the voltage derived from the battery, whereby the circuit of the entire receiver is energized from a single direct current voltage which is no greater than that of the battery, and a housing for enclosing the receiver circuits with said power transistor device being mounted on the outside of said housing for effective radiation of heat therefrom.

4. A radio receiver of the superheterodyne type to be used in an automobile having an electrical system which provides a direct current potential having a nominal value of 12 volts, with the potential being subject to variations during operation of the automobile, and which receiver is adapted to operate from signals picked up by an antenna mounted on the automobile, such receiver including in combination, radio frequency amplifier means including a first vacuum tube and providing voltage amplification of received radio frequency signals, converter means including a second vacuum tube coupled to said radio frequency amplifier means and providing frequency conversion of received signals to intermediate frequency signals, intermediate frequency amplifier means including a third vacuum tube coupled to said converter circuit and providing voltage amplification of the intermediate frequency signals, detector means coupled to said intermediate frequency amplifier circuit and demodulating the intermediate frequency signals to provide audio frequency signals, automatic volume control means coupled to said intermediate frequency amplifier means and deriving a control voltage representing the average value of the amplified intermediate frequency signals, said volume control means including portions applying said control voltage to said radio frequency amplifier means and to said intermediate frequency amplifier means for controlling the gain thereof, audio amplifier means including at least one junction-type power transistor device having base and emitter and collector electrodes, means connecting said base electrode to said detector circuit for applying the audio frequency signals to said transistor device for amplifying the current of the audio frequency signals therein, a loudspeaker coupled to said power transistor device for reproducing the audio signals, means whereby said power transistor device provides audio frequency current sufficient to drive said loudspeaker to produce sound at a level which can be conveniently heard in the automobile, energy applying means including a filter and direct current circuit connections for coupling each of said vacuum tubes and said power transistor device to said filter, first connector means for connecting said radio frequency amplifier means to the antenna of the vehicle, and second connector means for connecting said filter to the automobile electrical system, said second connector means forming the sole energizing connection for the receiver and applying only a single direct current voltage derived from the automobile electrical system to all of the circuits of the entire receiver, which single voltage is no greater than that of the electrical system.

5. A radio receiver of the superheterodyne type for operation in an automotive vehicle having an electrical system including a battery, with the battery voltage being subject to variations during operation of the vehicle, said receiver including in combination, wave signal receiving means for receiving radio frequency signals, means including a first vacuum tube providing voltage amplification of received radio frequency signals, said first vacuum tube having a control grid, a screen grid, a suppressor grid, and an anode, means coupling said control grid of said first tube to said wave signal receiving means, means including a second vacuum tube providing frequency conversion of received signals to intermediate frequency signals, said second vacuum tube having a control grid, a screen grid, and an anode, with said control grid of said second tube being coupled to said anode of said first tube, means including a third vacuum tube providing voltage amplification of the intermediate frequency signals, said third vacuum tube having a control grid, a screen grid, and an anode, with said control grid of said third tube being coupled to said anode of said second tube, means including a detector coupled to said third vacuum tube for demodulating the intermediate frequency signals to provide audio signals, automatic volume control means including rectifier means coupled to said third vacuum tube for providing a direct current voltage representing the average level of the intermediate frequency signals, means for applying said control voltage from said rectifier means to said control grid and said suppressor grid of said first vacuum tube to decrease the gain of radio frequency signals thereby as the strength of the intermediate frequency signals increases, means coupled to said rectifier means for applying a portion of the direct current voltage developed by said rectifier means to said control grid of said third vacuum tube to control the gain thereof, means including a fourth vacuum tube for amplifying the audio signal, said fourth vacuum tube having a control grid, a second grid, and an anode, with said control grid of said fourth vacuum tube being coupled to said detector, means including at least one power transistor device for amplifying the audio signals, with said transistor device being coupled to said anode of said fourth vacuum tube, a loudspeaker coupled to said power transistor device, means whereby said fourth vacuum tube has an output impedance which is sufficiently low to provide an impedance match with said power transistor circuit such that said power transistor circuit drives said loudspeaker at a level to be heard above the noise of the vehicle, and means including an energy applying circuit for connection to the vehicle electrical system and providing a positive potential having a value no greater than that of the vehicle electrical system, said energy applying circuit including direct current connections from said filter to said anodes of said vacuum tubes and to said transistor device and applying said positive potential thereto, said direct current connections including portions connecting said filter to said screen grids of said first and third vacuum tubes to apply substantially the full positive potential at said filter to said screen grids to provide maximum gain in said first and third tubes, said direct current connections also including a portion connected to said second grid of said fourth tube for applying a positive potential thereto.

6. A radio receiver of the superheterodyne type for operation in an automotive vehicle having an electrical system including a battery which provides a nominal direct current voltage of 12 volts, with the voltage being subject to variations during operation of the vehicle, said receiver including in combination, wave signal receiving means for receiving radio frequency signals, means providing voltage amplification of received radio frequency signals including a first vacuum tube having a plurality of grids at least one of which is coupled to said wave signal receiving means, means providing frequency conversion of received signals to intermediate frequency signals including a second vacuum tube coupled to said first vacuum tube, means providing voltage amplification of the intermediate frequency signals including a third vacuum tube having a control grid coupled to said second vacuum tube, means including a detector coupled to said third vacuum tube for demodulating the intermediate frequency signals to provide audio signals, automatic volume control means including rectifier means for providing a direct current control voltage representing the average level of the intermediate frequency signals, means for applying the said control voltage to at least two grids of said first vacuum tube to decrease the gain of radio frequency signals therein as the strength of the intermediate frequency signals increases, voltage divider means coupled to said rectifier means for applying a portion of the said control voltage to said grid of said third vacuum tube to control the gain thereof, means providing amplification of audio signals including a fourth vacuum tube coupled to said detector, means providing audio output signals including at least one power transistor device coupled to said fourth vacuum tube for amplifying the audio signals therefrom, a loudspeaker coupled to said power transistor device, said means providing amplification of audio signals providing an output impedance which is sufficiently low and related to the input impedance of said power transistor device such that power is applied thereto so that said means providing audio output current drives said loudspeaker at a level to be heard above the noise of the vehicle, all of said vacuum tubes having heaters and anode-cathode discharge paths, and energy applying means for connection to the vehicle electrical system and including a filter and direct current circuits connected to said heaters and said anode-cathode discharge paths of said vacuum tubes and to said transistor device and applying to each tube and transistor of the entire receiver only the voltage derived from the vehicle electrical system.

7. A radio receiver of the superheterodyne type for operation in an automotive vehicle having an electrical system including a battery which provides a nominal direct current voltage of 12 volts, said receiver including in combination, wave signal receiving means, means providing voltage amplification of received radio frequency signals including a first vacuum tube having a control grid, a screen grid, and an anode, means coupling said control grid to said wave signal receiving means, means providing frequency conversion of received radio frequency signals to intermediate frequency signals including a second vacuum tube having a control grid and an anode, with said control grid of said second vacuum tube being coupled to said anode of said first vacuum tube, means providing voltage amplification of the intermediate frequency signals including a third vacuum tube having a control grid, a screen grid, and an anode, means coupling said control grid of said third vacuum tube to said anode of said second vacuum tube, means for demodulating the intermediate frequency signals to provide audio signals including a detector coupled to said anode of said third vacuum tube, means providing audio amplification including a fourth vacuum tube having a control grid and an anode with said control grid of said fourth vacuum tube being coupled to said detector, means providing an audio output including a power transistor device coupled to said anode of said fourth vacuum tube for amplifying the audio signals therefrom, a loudspeaker coupled to said power transistor device, means whereby said fourth vacuum tube has an impedance related to that of said power transistor device such that driving power is applied to said transistor device and said transistor device provides sufficient current to said loudspeaker so that signals are reproduced thereby at a level to be conveniently heard within the vehicle, and energy applying means including a filter for connection to the vehicle electrical system for providing a direct current voltage therefrom no greater than that of the electrical system of the vehicle, said energy applying means including direct current connections from said filter to said screen grids and said anodes of said vacuum tubes and to said transistor circuit for applying only said direct current voltage of said filter thereto, whereby substantially the full voltage at said filter is applied to said screen grids of said first and third vacuum tubes to provide maximum gain therein.

8. In a radio receiver of the superheterodyne type for operation in an automotive vehicle having an electrical system including a battery having a nominal voltage of 12 volts and which receiver has radio frequency amplifier means with a first vacuum tube, converter means with a second vacuum tube, intermediate frequency amplifier means with a third vacuum tube, detector means, automatic volume control means with portions applying a control voltage to the radio frequency amplifier means and the intermediate frequency amplifier means, and a loudspeaker, the combination in the receiver including, audio amplifier means including a fourth vacuum tube having a space charge grid, a control grid, and an anode positioned in the order named, with said control grid being coupled to the receiver detector means, audio output means including a power transistor device and being coupled to said audio amplifier means for amplifying the audio signals therefrom, said audio output means applying output signals to the loudspeaker, means whereby said audio amplifier means has an output impedance which is sufficiently low and related to the input impedance of said audio output means to apply driving power thereto so that said audio output means provides current to said loudspeaker such that signals reproduced thereby are at a level to be conveniently heard within the vehicle, and energy applying means for connection to the vehicle electrical system including a filter and a direct current connection from said filter to said space charge grid and said anode of said fourth vacuum tube and to said transistor device for applying thereto only a single voltage derived from the vehicle electrical system, said energy applying means also serving to energize the first, second and third vacuum tubes from said single voltage whereby the entire receiver is energized through said energy applying circuit from the electrical system of the vehicle at said single voltage which is no greater than that of the battery of the electrical system.

9. An audio amplifier for a radio receiver to be used in a vehicle and energized from a battery of the vehicle which provides a direct current potential having a nominal value of 12 volts, and which receiver is of the superheterodyne type and has a plurality of vacuum tubes for amplifying and converting the received waves, detector means for deriving the audio signal from the received waves, and a loudspeaker for reproducing the audio signal, said audio amplifier coupling the detector to the loudspeaker and including in combination, first and second audio circuit portions and a transformer for interconnecting the same, a vacuum tube in said first audio circuit portion, a junction-type power transistor in said second audio circuit portion including a base electrode connected to said transformer, means whereby said first audio circuit portion cooperates with said transformer to provide an impedance related to that of said base electrode to apply signals thereto so that the output of said audio amplifier is sufficient to drive the loudspeaker to produce sound at a level which can be conveniently heard in the vehicle, and means connecting said vacuum tube and said transistor to the vehicle battery for applying to said tube and said transistor of said audio amplifier only a single voltage derived from the battery and having a value no greater than that of the battery, said last named means serving to apply said single voltage to all the vacuum tubes of the circuit of the entire receiver.

10. An audio amplifier for a radio receiver to be used in a vehicle and energized from a battery of the vehicle which provides a direct current potential having a nominal value of 12 volts, and which receiver is of the superheterodyne type and has a plurality of vacuum tubes for amplifying and converting the received waves, a detector for deriving the audio signal from the received wave, and a loudspeaker for reproducing the audio signal, said audio amplifier coupling the detector to the loudspeaker and including in combination, first and second audio circuit portions, a vacuum tube in said first audio circuit portion, including a space charge grid, a control grid, and an anode positioned in the order named, means for applying the audio signal to said control grid of said vacuum tube, a transistor in said second audio circuit portion, means connecting said anode of said vacuum tube to said transistor of said second audio circuit portion whereby said audio amplifier provides audio frequency current sufficient to drive the loudspeaker to produce sound at a level which can be conveniently heard in the vehicle, and means connecting said vacuum tube and said transistor to the vehicle battery for applying only a single voltage derived from the battery to said space charge grid and said anode of said tube and to said transistor of said audio amplifier, said means serving to apply said single voltage to the circuit of the entire receiver.

11. An audio amplifier for a radio receiver which operates from a direct current potential source having a nominal value of 12 volts, and which receiver includes a detector for providing an audio signal, said audio amplifier including in combination, a first audio circuit having a vacuum tube including a cathode, a space charge grid, a control grid, and an anode positioned in the order named, means including said vacuum tube providing a space charge circuit, means for applying the audio signal to said control grid of said tube, an audio output circuit for amplifying the audio signals, at least one power transistor device in said audio output circuit, including base, emitter and collector electrodes, means connecting said base electrode of said transistor device of said audio output circuit to said anode of said vacuum tube of said first audio circuit and cooperating with said audio circuits to provide amplified audio frequency current, and means for connecting said audio amplifier to the direct current potential source and applying to said space charge grid and said anode of said vacuum tube and to said transistor device only the voltage of the source.

12. A radio receiver of the superheterodyne type to be used in a vehicle and energized from a battery of the vehicle which provides a direct current potential having a value of the order of 12 volts, such receiver including in combination, wave signal input means for providing radio frequency signals, first means providing frequency conversion of received frequency signals to provide intermediate frequency signals, said first means including at least one vacuum tube and including means for controlling the gain of signals translated by said first means, means providing voltage amplification of the intermediate frequency signals and including a second vacuum tube having cathode, screen, and anode electrodes, means for demodulating the intermediate frequency signals to provide audio frequency signals, second means providing current amplification of the audio signals including at least one power transistor device having a base electrode, means applying the audio signals to said base electrode for amplification by said transistor device, a loudspeaker coupled to said power transistor device for reproducing the audio signals, said second means providing audio frequency current sufficient to drive said loudspeaker to produce sound at a level which can be conveniently heard in the vehicle, and third means providing energizing current for the receiver circuit from the vehicle battery including direct current circuit means connected to each of said vacuum tubes and to said power transistor device, said third means deriving only a single direct current voltage from the battery and applying only this single voltage to said tubes and said transistor device, said direct current circuit means being connected to said cathode, screen, and anode electrodes of said second vacuum tube and applying substantially said entire single voltage between said cathode electrode and said screen and anode electrodes thereof, and the entire receiver being energized from said single voltage which is no greater than that of the battery.

13. A radio receiver of the superheterodyne type to be used in a vehicle and energized from a battery of the vehicle which provides a direct current potential having a value of the order of 12 volts, such receiver including in combination, wave signal input means for providing radio frequency signals, first means coupled to said signal input means including radio frequency amplifier means and means providing frequency conversion of received radio frequency signals to provide intermediate frequency signals, said means providing frequency conversion including a first vacuum tube, means for controlling the gain of signals translated by said first means, intermediate frequency amplifier means providing voltage amplification of the intermediate frequency signals, a second vacuum tube in one of said amplifier means having cathode, screen, and anode electrodes, means for demodulating the intermediate frequency signals to provide audio frequency signals, second means providing current amplification of the audio signals including at least one power transistor device having a base electrode, means applying the audio signals to said base electrode for amplification by said transistor device, a loudspeaker coupled to said power transistor device for reproducing the audio signals, said second means providing audio frequency current sufficient to drive said loudspeaker to produce sound at a level which can be conveniently heard in the vehicle, and third means providing energizing current for the receiver circuit from the vehicle battery including direct current circuit means connected to each of said vacuum tubes and to said power transistor device, said third means deriving only a single direct current voltage from the battery and applying only this single voltage to said tubes and said transistor device, said direct current circuit means being connected to said cathode, screen, and anode electrodes of said second vacuum tube and applying substantially said entire single voltage between said cathode electrode and said screen and anode electrodes thereof, and the entire receiver being energized from said single voltage which is no greater than that of the battery.

14. A radio receiver of the superheterodyne type to be used in an automobile having an electrical system which provides a direct current potential having a nominal value of 12 volts, with the potential being subject to variations during operation of the automobile, with which receiver is adapted to operate from signals picked up by an antenna mounted on the automobile, such receiver including in combination, radio frequency amplifier means including a first vacuum tube and providing voltage amplification of received radio frequency signals, converter means including a second vacuum tube coupled to said radio frequency amplifier means and providing frequency conversion of received signals to intermediate frequency signals, intermediate frequency amplifier means including a third vacuum tube coupled to said converter circuit and providing voltage amplification of the intermediate frequency signals, detector means coupled to said intermediate frequency amplifier circuit and demodulating the intermediate frequency signals to provide audio frequency signals, automatic volume control means coupled to said intermediate frequency amplifier means and deriving a control voltage representing the average value of the amplified intermediate frequency signals, said volume control means including a portion applying said control voltage to at least one of said vacuum tubes for controlling the gain thereof, audio amplifier means including at least one junction-type power transistor device having base and emitter and collector electrodes, means coupling said base electrode to said detector circuit for applying the audio frequency signals to said transistor device for amplifying the current of the audio frequency signals therein, a loudspeaker coupled to said audio amplifier means for reproducing the audio signals, means whereby said audio amplifier means provides audio frequency current sufficient to drive said loudspeaker to produce sound at a level which can be conveniently heard in the automobile, energy applying means including a filter and direct current circuit connections for coupling each of said vacuum tubes and said power transistor device to said filter, first connector means for connecting said radio frequency amplifier means to the antenna of the vehicle, and second connector means for connecting said filter to the automobile electrical system, said second connector means forming the sole energizing connection for the receiver and applying only a single direct current voltage derived from the automobile electrical system to all of the circuits of the entire receiver, which single voltage is no greater than that of the electrical system.

15. A radio receiver in accordance with claim 14 wherein said audio amplifier means includes transformer means connecting said collector electrode of said transistor device to said loudspeaker.

16. A radio receiver in accordance with claim 14 wherein said audio amplifier means includes means connecting said emitter electrode of said transistor device to said filter to apply said single voltage to said emitter electrode, and transformer means connecting said collector electrode of said transistor device to said loudspeaker.

17. A radio receiver in accordance with claim 14 wherein said audio amplifier means includes first and second power transistor devices, and circuit means for connecting said power transistor devices in a push-pull circuit and for applying the output thereof to said loudspeaker.

18. A radio receiver in accordance with claim 14 wherein said audio amplifier means includes first and second power transistor devices, circuit means for connecting said power transistor devices in a push-pull circuit and for applying the output thereof to said loudspeaker, and a third transistor device for applying audio frequency signals to said push-pull circuit.

19. A radio receiver in accordance with claim 14 wherein said audio amplifier means includes first and second transistor devices, and circuit means for connecting said transistor devices in cascade and for applying the output thereof to said loudspeaker.

References Cited in the file of this patent

UNITED STATES PATENTS

| | | |
|---|---|---|
| 1,871,537 | Lederer | Aug. 16, 1932 |
| 2,037,485 | Ritter | Apr. 14, 1936 |
| 2,047,151 | Mitchell | July 7, 1936 |
| 2,073,038 | Wheeler | Mar. 9, 1937 |
| 2,172,160 | Dome | Sept. 5, 1939 |
| 2,719,190 | Raisbeck | Sept. 27, 1955 |

FOREIGN PATENTS

| | | |
|---|---|---|
| 150,232 | Australia | Feb. 23, 1953 |

OTHER REFERENCES

Theory of Multi-electrode Vacuum Tubes, by Pidgeon. Bell System Technical Journal, only p. 72 cited. January 1935.

"How to Build a Hurricane Emergency Receiver"—article in Popular Mechanics, vol. 67, February 1937, pp. 258–259.

Publication: RCA Review, April 1937, pp. 94–112, article by Smith, Automobile Receiver Design.

Publication: Radio Receiver BC–1023A Instruction Book for Operation and Maintenance, pp. 1–3, 1–4, 3–1, 4–1, 4–2, 4–3, Fig. 7–7, 7–8, 7–9, P. B. 43613 O. T. Services Bib. Scien. and Indus. Reports, Dec. 13, 1946.

Publication:–Principle of Transistor Circuits, by Shea, pp. 156, 157 and 158. Co. 1953 by John Wiley and Sons.

High-gain Low-drain Portable Radio, by Queen, Radio-Electronics, March 1954, pp. 84, 86, 87, and 90.

Publication: Proc. I. R. E., Aug. 1954, pp. 1247–1250, article by Roka et al., Developmental Germanium Power Transistor.

Tube-Transistor Radio, pp. 48 and 49 of Electronic Design, for July 1955.